United States Patent [19]

Narasimham

[11] Patent Number: 4,941,905
[45] Date of Patent: Jul. 17, 1990

[54] METHODS OF SOOT OVERCLADDING AN OPTICAL PREFORM

[75] Inventor: Pundi L. Narasimham, Norcross, Ga.

[73] Assignee: American Telephone and Telegraph Company, AT&T Technologies, Inc., Berkeley Heights, N.J.

[21] Appl. No.: 168,552

[22] Filed: Mar. 4, 1988

Related U.S. Application Data

[63] Continuation of Ser. No. 6,902,272, Aug. 29, 1986, abandoned.

[51] Int. Cl.$^5$ .................... C03B 37/018; C03B 37/012
[52] U.S. Cl. ........................... 65/3.12; 65/3.11;
      65/18.2; 65/901; 219/10.55 M
[58] Field of Search ................ 65/18.2, 18.1, 3.12,
      65/3.11, 40, 901; 219/10.55 M, 10.55 A, 10.55 R

[56] References Cited

U.S. PATENT DOCUMENTS

| | | | |
|---|---|---|---|
| 822,424 | 6/1906 | Bottomley | 65/18.2 |
| 2,364,526 | 12/1944 | Hansell | 219/10.55 R |
| 3,167,521 | 1/1965 | Heckmaier | 264/25 X |
| 3,457,385 | 7/1969 | Cumming | 219/10.55 |
| 3,553,413 | 1/1971 | Souliet | 219/10.55 A |
| 3,806,570 | 4/1974 | Flamenbaum | 65/3.12 |
| 3,826,560 | 7/1974 | Schultz | 65/3.12 |
| 3,865,647 | 2/1975 | Reuschel | 65/3.12 |
| 3,933,454 | 1/1976 | DeLuca | 65/18.2 |
| 4,147,911 | 4/1979 | Nishitani | 219/10.55 M |
| 4,230,731 | 10/1980 | Tyler | 219/10.55 M |
| 4,310,339 | 1/1982 | Blankenship | 65/18.2 X |
| 4,339,648 | 7/1982 | Jean | 219/10.55 M |
| 4,402,720 | 9/1983 | Edahiro et al. | 65/3.12 |
| 4,453,961 | 6/1984 | Berkey | 65/3.12 |
| 4,508,554 | 4/1985 | Beerwald | 65/3.12 |
| 4,529,857 | 7/1985 | Meek | 219/10.55 M |
| 4,605,428 | 8/1986 | Johnson, Jr. et al. | 65/18.1 |

FOREIGN PATENT DOCUMENTS

| | | | |
|---|---|---|---|
| 21183 | 1/1981 | European Pat. Off. | 264/25 |
| 94053 | 11/1983 | European Pat. Off. | |
| 147029 | 7/1985 | European Pat. Off. | |
| 216739 | 1/1987 | European Pat. Off. | |
| 51-67309 | 6/1976 | Japan | 65/18.1 |
| 54-47666 | 4/1979 | Japan | 65/3.12 |
| 442989 | 7/1984 | Sweden | |
| 2158054 | 11/1985 | United Kingdom | |

*Primary Examiner*—Kenneth M. Schor
*Attorney, Agent, or Firm*—Edward W. Somers

[57] ABSTRACT

An optical preform is prepared first by depositing soot about a glass substrate rod (22) to form a boule. Then the soot boule is sintered to consolidate the material and provide a preform from which optical fiber is drawn. The boule is relatively large so that the resulting preform is capable of providing more optical fiber than those used in the past. In order to be able to sinter successfully the enlarged boule, microwave energy from a furnace (60) is coupled to the glass rod so that the sintering proceeds from the rod radially outwardly thereby allowing gases readily to escape and rendering the process highly efficient.

16 Claims, 4 Drawing Sheets

METHODS OF SOOT OVERCLADDING AN OPTICAL PREFORM

This application is a continuation of application Ser. No. 902,272, filed Aug. 29, 1986, now abandoned.

TECHNICAL FIELD

This invention relates to methods of soot overcladding an optical preform. More particularly, it relates to methods for sintering a boule which has been deposited about a substrate rod by coupling microwave energy to the substrate rod.

BACKGROUND OF THE INVENTION

Optical fiber of the type used to carry optical signals is fabricated typically by heating and drawing a portion of an optical preform comprising a refractive core surrounded by a protective glass cladding. Presently, there are several known processes for fabricating preforms. The modified chemical vapor deposition (MCVD) process, which is described in U.S. Pat. No. 4,217,027 issued in the names of J. B. MacChesney et al. on Aug. 12, 1980 and assigned to Bell Laboratories, Inc., has been found most useful because the process enables large scale production of preforms which yield very low loss optical fiber.

During the fabrication of preforms by the MCVD process, precursor, reactant-containing gases, such as $SiCl_4$ and $GeCl_4$ are passed through a rotating substrate tube which is made of silica glass. A torch heats the tube from the outside as the precursor gases are passed therethrough, causing deposition of submicron-sized glass particles on the inside surface of the tube. The torch is moved along the longitudinal axis of the tube in a plurality of passes to build up layer upon layer of glass to provide a preform tube. Once a sufficient number of layers have been deposited, the preform tube is then heated to cause it to be collapsed to yield a preform or preform rod as it is often called.

Increased demand for optical fiber has prompted efforts to increase the productivity of the MCVD process. However, the MCVD process rate is limited by several factors including the thickness of the wall of the substrate tube. To obtain optical fiber having optimal optical and geometrical characteristics, the preform must have a core-to-cladding geometric ratio within specified limits. Increasing the mass of the substrate tube to obtain a larger preform requires that the wall of the substrate tube be made thicker. Increasing the thickness of the wall of the substrate tube, however, reduces the rate of heat transfer to the reactant-containing gases, thereby increasing the time required to deposit and sinter each layer of glass particulates. If the wall of the substrate tube is too thick, insufficient heat transfer may occur, which may result in the formation of bubbles or incomplete sintering.

One way in which the productivity of the MCVD process can be increased is first to produce a preform having a relatively large core and a larger than desired core-to-cladding geometric ratio. This preform is inserted into a glass tube which is referred to as an overcladding tube and which is then collapsed onto the preform. This is referred to as the rod and tube technique. It is desirable that any added eccentricity of material about the preform core due to overcladding should be minimized. Radial misalignment between the overcladding tube and the large core preform also should be minimized, otherwise the resultant drawn fiber core may be too eccentric which inhibits proper splicing of the drawn fiber to another. This may be difficult to do inasmuch as for relatively thick preforms, the overcladding is accomplished in stages. Each successive tube has its own longitudinal centroidal axis as does the core, and the multiple overcladding increases the probability for eccentricity among multiple tubes.

In another process for increasing production rates, soot overcladding is used to provide an enlarged preform. In such a process, soot is deposited onto a substrate such as, for example, a preform rod which may be manufactured by the modified vapor chemical deposition process. See, for example, priorly identified U.S. Pat. No. 4,217,027. After the soot has been deposited to provide a boule, the soot is sintered by subjecting successive increments of length of the boule to a heat source. Typically, the boule and rod are suspended with their longitudinal axes, which are coaxial, being vertical and moved downwardly into a furnace. Of course, the preform rod provided by the modified chemical vapor deposition process is modified to provide a suitable core-to-cladding ratio.

Soot overcladding has certain advantages over the rod and tube process. For example, as mentioned hereinbefore, as larger tubes or as multiple tube clads are used, the eccentricity of the core and cladding generally increases. This is not true as the size of the soot boule increases. However, other problems relating to soot boules must be overcome.

Problems have arisen in the sintering of enlarged boules. Typically, a source applies heating energy to the outer surface of the boule which causes the outer layer of soot to consolidate and become a layer of transparent solid glass. When soot is deposited onto the substrate rod, the silicon tetrachloride and oxygen reactants provide silicon dioxide, which is the soot, and chlorine as a byproduct. When the soot is deposited on the substrate rod, it is loosely bound with voids between particles on the order of 1 $\mu$m being filled with the chlorine and other by-product gases. Subsequently, some or all of the trapped gases are replaced with helium, during sintering.

In order to provide a preform from which suitable optical fiber is drawn, the helium gas and any chlorine gas remaining in the voids must be driven out. If the heating proceeds inwardly toward the substrate rod, this may be difficult to do inasmuch as the gases may become trapped between layers of glass and the substrate rod. As the boule is moved into a furnace, for example, a sintering wavefront extends from a position adjacent to the substrate rod to an outer surface of the boule. This causes the gases to travel along the rod toward the upper end thereof to escape. With such a lengthened path of escape for the gases, the process is less efficient than desired.

Also, and perhaps more importantly, a boule having an extremely large outer diameter may not be processable by currently used methods. After the heat energy causes a layer of soot adjacent to the outer surface of the boule to be consolidated into glass, the heat energy is required to penetrate that layer to cause the next successive inner stratum of soot to consolidate. As a result, an inner stratum of soot may not be consolidated if the boule is too large. As should be apparent, this possibility places disadvantageously a limitation on the boule size.

What is needed and what seemingly is not provided by the prior art are methods of soot overcladding in which relatively large boules may be provided. Such methods must be competitive costwise with current methods and must provide a boule which is sintered throughout such that quality optical fiber may be drawn therefrom.

SUMMARY OF THE INVENTION

The foregoing problem of the prior art has been overcome by the methods of this invention. In a method of providing a preform from which optical fiber is drawn, a substrate to which microwave energy is capable of being coupled is provided. Then the substrate is caused to be surrounded substantially with an optically suitable material which is capable of being consolidated about the substrate. A source of microwave energy is coupled to the substrate to sinter and consolidate the optically suitable material in a direction outwardly from the substrate to provide an optical preform from which optical fiber is capable of being drawn.

In one embodiment of providing a glass preform from which optical fiber may be drawn, a glass substrate rod is provided. Then a soot material is deposited on the substrate rod. The substrate rod is such that microwave energy is capable of being coupled to it. After it has been deposited on the rod, the soot material is sintered by coupling a source of microwave energy to successive increments of length of the rod. This sinters and consolidates the optically suitable material in a direction radially away from the substrate rod to provide an optical preform from which optical fiber is capable of being drawn.

Advantageously, this dielectric heating of the rod first causes the innermost portions of the soot to become consolidated into glass. Inasmuch as the heating energy is coupled to glass, the heating energy couples through each successively consolidated layer of glass so that it is immediately adjacent to the next portion of soot to be consolidated.

Further, the gases in the soot boule are not trapped because the sintering of the boule begins at the center as opposed to beginning at the outer periphery of the boule in conventional sintering processes. The gases here are pushed outwardly toward the free peripheral surface of the boule as opposed to becoming trapped between the consolidated soot layers and the substrate rod.

BRIEF DESCRIPTION OF THE DRAWINGS

Other features of the present invention will be more readily understood from the following detailed description of specific embodiments thereof when read in conjunction with the accompanying drawings, in which.

DETAILED DESCRIPTION

Figure 1:
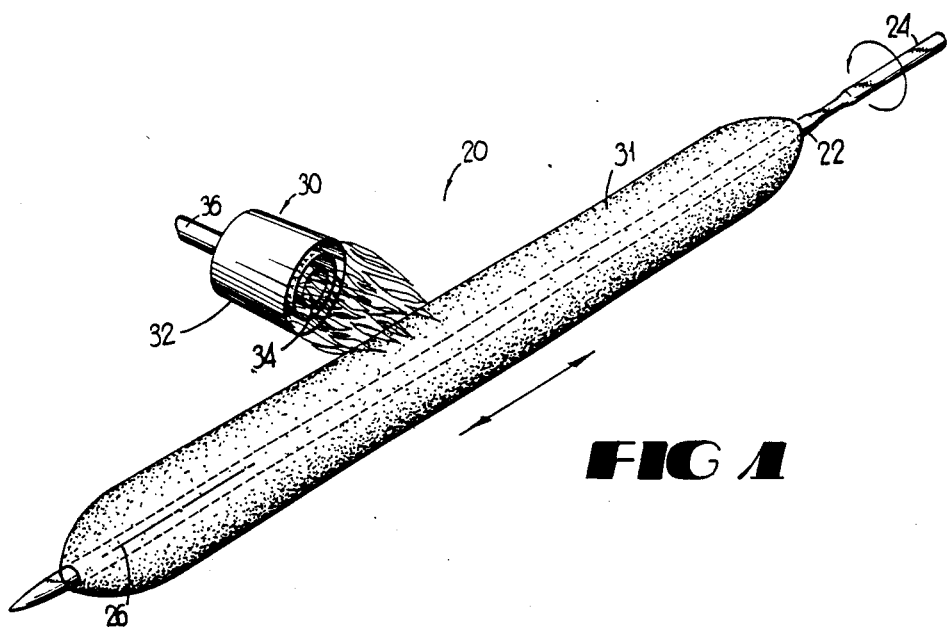
FIG. 1 is an overall schematic perspective view of an apparatus of this invention for generating a soot boule.

Referring now to FIG. 1, there is shown an arrangement 20 for soot overcladding. A substrate in the form of a mandrel 22 which is made of glass or other suitable material and which may be a preform made by the modified chemical vapor deposition (MCVD) process disclosed in hereinbefore identified U.S. Pat. No. 4,217,027 is provided. Typically, the mandrel or preform has an outer diameter of about 19 mm and a length of about 70 to 95 cm. It includes a handle 24 to facilitate its mounting above a furnace.

The mandrel 22 is mounted in a lathe-like apparatus (not shown) with its ends being supported and so that it can be turned rotatably about a longitudinal axis 26 thereof. Also, the lathe-like apparatus is such that the mandrel is capable of being moved reciprocally along a path of travel in directions along the longitudinal axis 26 of the mandrel.

Positioned adjacent to the mandrel is a deposition torch designated generally by the numeral 30. The deposition torch 30 is used to cause soot 31 of an optically suitable material to be deposited on the mandrel 22. In order to accomplish this, the deposition torch 30 includes a nozzle 32 having a centrally disposed passageway 34 therethrough. The passageway 34 is connected to a conduit 36 through which materials which are to form the soot are flowed. In a preferred embodiment, the materials include silicon tetrachloride ($SiCl_4$), germanium tetrachloride ($GeCl_4$) and phosphorus oxychloride ($PoCl_3$).

Figure 2:
FIGS. 2 and 3 are views of a conventionally sized soot boule and of the boule being subjected to a conventional heat source, respectively.

In the arrangement shown in FIG. 1, the deposition torch 30 is stationary and the mandrel 22 is moved reciprocally along the path of travel to cause successive portions thereof to be moved past the deposition torch. As this occurs, the materials being flowed from the deposition torch 30 react and provide a reaction product which comprises the soot deposited on the mandrel 22. The soot in place on the mandrel 22 commonly is referred to as a soot boule. A normal size boule having a diameter of 50 mm and length of 80 cm is designated generally by the numeral 38 (see FIG. 2).

Typically, the mandrel 22 is moved in about 100 or more passes past the deposition torch 30 to accumulate the desired size soot boule. Of course, as the mandrel 22 is moved reciprocally, it also is being turned rotatably to cause the soot boule to have a generally circular cross-section. Also, typically, the torch is a methane torch which is available commercially and which provides a temperature in the range of 800° to 1000° C.

Figure 3:
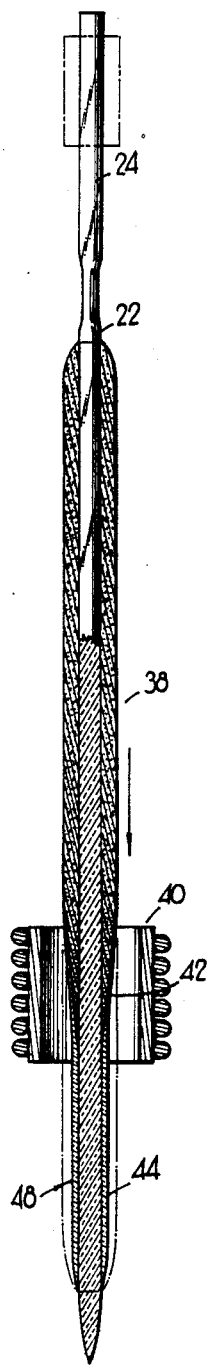

After the soot boule has been formed on the mandrel 22, the soot must be consolidated. Generally, this is accomplished by sintering the soot. As can be seen in FIG. 3, it is customary to suspend the soot boule by the preform handle 24 and then to advance the lower end of the boule into a furnace 40 (see also FIG. 4). Typically, the furnace 40 is a resistance coil furnace which causes heat to be applied from the outer surface of the soot inwardly toward the mandrel 22. As successive increments of length of the soot boule are moved into the furnace 40, a sintering wavefront 42 is formed. The soot is consolidated and a layer 44 of glass adjacent to the mandrel is provided.

Figure 4:
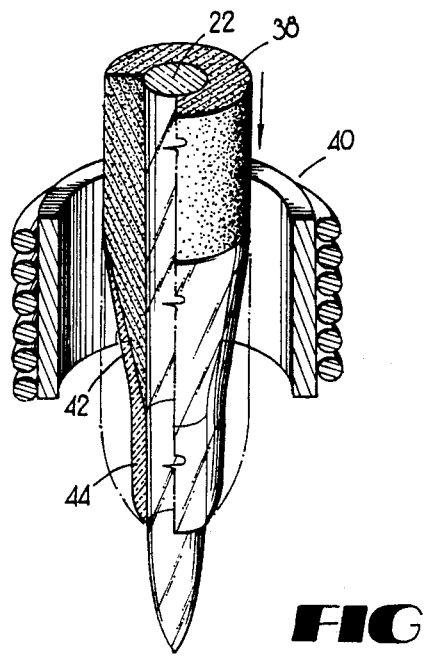
FIG. 4 is a perspective view of a portion of a furnace which is used to sinter the boule of FIG. 2.
Figure 5:
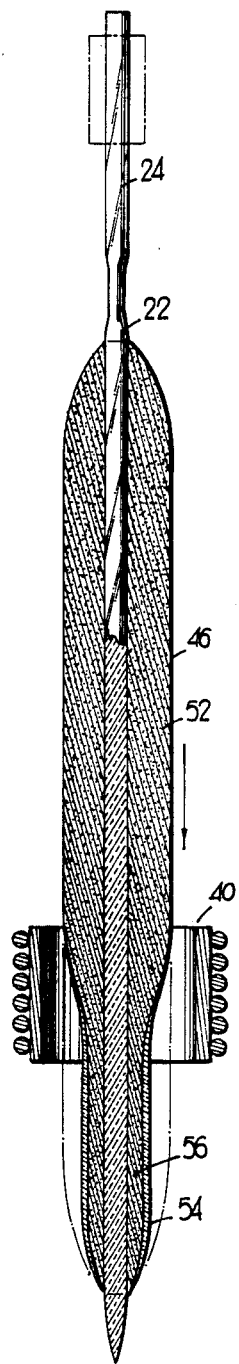
FIG. 5 is an elevational view of an enlarged boule which has been produced by the apparatus of FIG. 1 and which is being sintered by a prior art arrangement.

Referring now to FIGS. 3 and 5, a comparison of the sintering of the normal size boule 38 and an enlarged boule which is designated by the numeral 46 is seen. An enlarged boule may have an outer diameter of about 80 mm. In FIG. 3, the normal size soot boule 38 is depicted with a portion of its length sintered. The mandrel 22 and the glass layer consolidated from the soot is a preform and is designated by the numeral 48. The sintering wavefront 42 is shown in FIGS. 3 and 4 along the portion of the boule within the furnace 40.

Problems arise when the enlarged soot boule 46 is moved through a conventional sintering furnace 40 (see FIG. 5). Therein, an outer layer 52 of the soot is consolidated to provide a glass layer 54. However, because of the thickness of the soot boule, the heat energy is sufficient only to consolidate the outer layer into glass. As a result, an underlying layer 56 of soot remains unconsolidated. Furthermore, it becomes more difficult for the heat energy to reach that unconsolidated layer 56 of soot because of the now intervening layer 54 of glass which acts as an insulator.

Figure 6A:
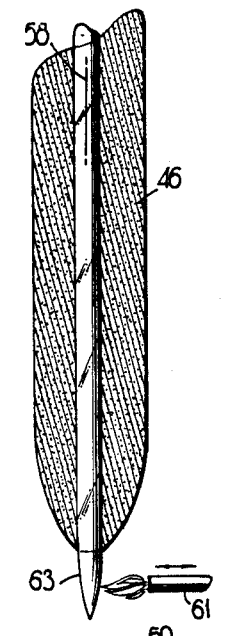
FIGS. 6A-6C are a sequence of views which depict the sintering of an enlarged boule in accordance with the principles of this invention.
Figure 6A:
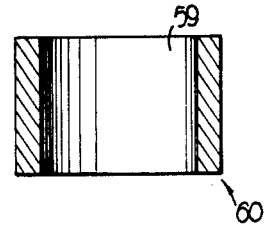
Figure 6B:
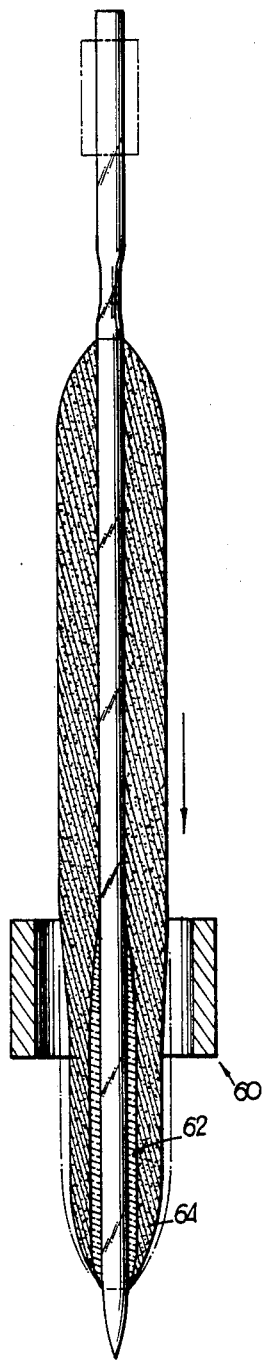
Figure 6C:
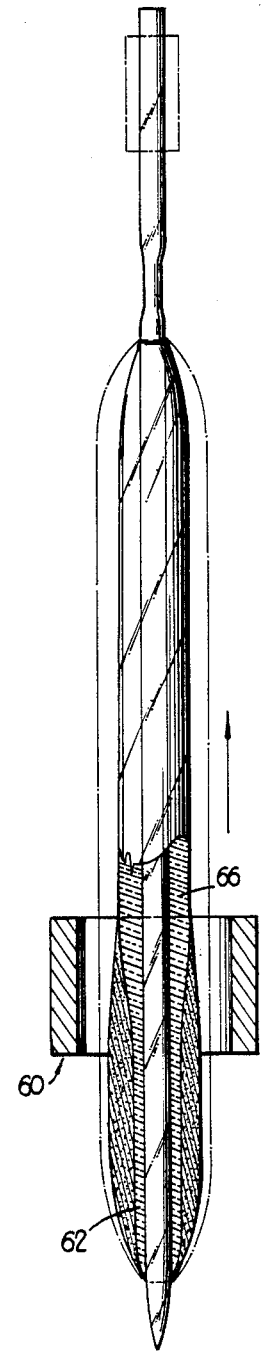

This problem has been overcome by the methods of this invention. Referring now to FIGS. 6A–6C, there is shown an enlarged soot boule 46 which is positioned with a longitudinal axis 58 thereof being vertical. The lower end of the boule is aligned with a cavity 59 of a dielectric heating source designated generally by the numeral 60. The soot boule 46 is supported by suitable apparatus (not shown) which is well known in the art and which is capable of causing the soot boule to be moved reciprocally vertically into and through the furnace 60.

The furnace 60 in a preferred embodiment is a microwave energy source which includes a microwave generator. Microwaves occupy a region in the electromagnetic spectrum which is bounded by radio waves on the side of longer wavelengths and by infrared waves on the side of shorter wavelengths. According to page 482 of volume 8 of the McGraw-Hill *Encyclopedia of Science and Technology,* published in 1977, there are no sharp boundaries between these regions except by arbitrary definition. However, a magnetron such as one commercially available from Litton Industries generates radio-frequency energy over a limited portion of the microwave frequency range of 1000–40,000 MHz. In the preferred embodiment of this invention, the microwave energy has a frequency of about 2450 MHz.

Apparatus for dielectric heating, that is, the heating of materials by microwave energy is disclosed in U.S. Pat. No. 3,457,385. See also Swedish patent publication number 442 989 which was published on Feb. 10, 1986 and which discloses the use of microwave energy for heating relatively thick-walled glass tubes.

It should be understood that the mandrel 22 need not be glass. What is important is that the mandrel on which the soot boule is formed is comprised of a material to which microwave energy is capable of being coupled.

Prior to the consolidation of the soot, the mandrel 22 must be prepared so that microwave energy can be coupled to it. For such coupling to occur, it has been found that the temperature of the mandrel 22 must be about 1000° C. This is accomplished by applying heat energy from a torch 61 (see FIG. 6A) to an exposed end 63 of the mandrel 22 to elevate the temperature of the mandrel to a value at which coupling of the microwave energy will occur.

After the mandrel 22 has been preheated, the mandrel and the soot boule 46 are moved downwardly to cause a lower end portion of each to become disposed in the furnace 60. Advantageously, the microwave heat source 60 causes heat energy to be coupled to the substrate or mandrel 22. The heat energy which is coupled to the mandrel 22 is radiated outwardly to heat the soot. This causes the soot to be sintered and become consolidated. In a preferred embodiment, the microwave energy imparted to the mandrel 22 causes the temperature of the coupled material to be in the range of about 1200°–1400° C.

As is seen in FIG. 6B, on an initial pass or passes, an inner portion of the soot is consolidated to form a layer 62 of glass which is adjacent to the mandrel 22. A portion 64 of the soot remains unconsolidated.

Subsequently, as is shown in FIG. 6C, on further passes, additional soot material is consolidated to cause the glass adjacent to the substrate 22 to increase in thickness to that layer designated 66. Inasmuch as the microwave energy couples to the glass, each successive incremental portion of glass consolidated is coupled to the microwave heat source. This results in the heat source being immediately adjacent to the unconsolidated soot and yields a highly efficient process. The resulting optical preform has an outer diameter such that a ratio of it to the diameter of the mandrel is in the range of about 2 to 4.

Additional advantages of the methods of this invention relate to efficiency and to the escape of gases generated during the consolidation process. In conventional sintering processes, some of the heat energy which is applied to the outside of the soot boule is lost to the environment. With the methods of this invention, substantially all the microwave energy applied to the mandrel is applied as heat energy to the soot boule. Also, in the methods of this invention, gases generated during the consolidation escape easily through the unconsolidated soot. This contrasts to conventional sintering processes in which the sintered outer layer traps the gases inside and forces them upwardly to escape. Their path to escape is long compared to the radial path established in the present invention.

Figure 7:
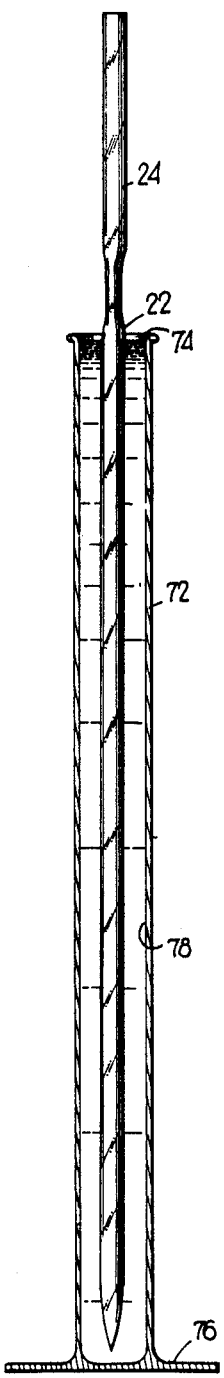
FIGS. 7 and 8 depict steps in a sequence of steps of a method of making a boule which is then sintered in accordance with this invention.
Figure 8:
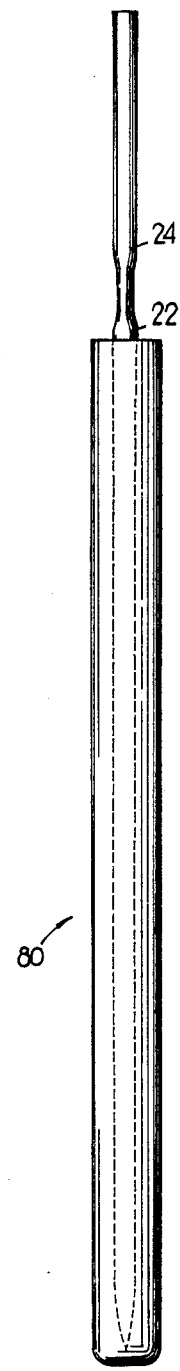

The methods of this invention also include processes other than that depicted in FIG. 1 for the provision of a soot boule. Referring now to FIGS. 7 and 8, there are shown several steps of a sol-gel process for the manufacture of an optical fiber preform. Such a process is described and claimed in U.S. Pat. No. 4,605,428 which issued on Aug. 12, 1986 in the names of D. W. Johnson, Jr., J. B. MacChesney, and E. M. Rabinovich and which is incorporated by reference hereinto.

In a sol-gel process, a mandrel 22 which may be made of glass is positioned with its longitudinal axis being vertical and so that it is disposed within a cylindrical container 72 having an open top 74 and a base 76. The container 72 is disposed concentrically about the mandrel 22.

Particles of a composition of matter comprising, for example, tetraethoxy silane of 99.99% purity diluted by ethyl alcohol are dispersed in a liquid comprising ammonia water to provide a homogeneous sol. Afterwards, the sol is introduced into the container 72 which functions as a mold to prepare a rod-type wet gel filling the container between an inner wall 78 and the mandrel 22. After the sol has been poured into the container 72, it is allowed to gel. The resulting gel body and the mandrel 22 are removed from the container and the water and the alcohol are caused to evaporate to provide a dried gel. The gel comprises a powder-like material adhered to the mandrel. In this instance, a boule 80 comprising particles of dried gel attached to the mandrel 22 is formed by the sol-gel process.

The boule 80 produced by what is referred to as the sol-gel process must be subjected to heat energy to consolidate the dried gel into a transparent glass layer about the mandrel. This is accomplished by sintering the boule 80 in the same manner in which the soot boule of FIG. 1 is sintered. Accordingly, the sol-gel boule and the mandrel 22 are suspended above the dielectric heating furnace 60 and moved reciprocally in one direction and then in an opposite direction into and through the furnace 60.

It should be apparent that the heating apparatus which is used to sinter a boule to consolidate the material thereon and provide an optical preform may be used also to condition the preform for drawing. In that instance, the temperature of the mandrel and each successive portion of consolidated soot is increased to the range of about 1600°–1800° C. The mandrel and the soot boule are advanced into the furnace at a speed which is sufficiently low to allow in one pass the complete sintering of the soot. Optical fiber is drawn from a leading, lower end of the consolidated soot and mandrel, measured, coated and taken up as is shown in U.S. Pat. No. 4,547,641 which issued on Oct. 15, 1985 in the names of W. C. Bair, et al. and which is incorporated by reference hereinto.

It is to be understood that the above-described arrangements are simply illustrative of the invention. Other arrangements may be devised by those skilled in the art which will embody the principles of the invention and fall within the spirit and scope thereof.

What is claimed is:

1. A method of providing a preform from which optical fiber is drawn, said method comprising the steps of:
   providing a glassy substrate which has an axis and an outer peripheral surface and to which microwave energy is capable of being coupled;
   causing the outer peripheral surface of the substrate to be substantially surrounded with a material which is optically suitable for light transmission, which is capable of being sintered and consolidated about the substrate and which when sintered is coupled to a source of microwave energy; and then
   coupling a source of microwave energy to the substrate to cause each successive portion of the optically suitable material in a direction outwardly from the axis of the substrate to be sintered and consolidated and thereby become coupled to the source of microwave energy so that each next successive portion of unsintered material, which is next to be sintered, is contiguous to a sintered portion which has just been sintered and which is coupled to the source of microwave energy, to provide an optical preform from which optical fiber is capable of being drawn.

2. The method of claim 1, wherein said material which is optically suitable is formed by a sol-gel process.

3. A method of providing a preform from which optical fiber is drawn, said method comprising the steps of:
   providing an elongated glassy substrate having a generally circular cross-section transverse to a longitudinal axis of the substrate onto which a soot material is capable of being deposited said substrate having an outer circumferential surface, and to which substrate microwave energy is capable of being coupled;
   depositing on the outer circumferential surface of the substrate a soot material which is capable of being consolidated and fused to the substrate and which when consolidated and fused to the substrate is capable of becoming coupled to microwave energy; and then
   coupling a source of microwave energy to the substrate to sinter and consolidate the deposited soot material in a direction radially outwardly from the substrate to provide an optical preform from which optical fiber is capable of being drawn said coupling being effected such that as each successive layer of the soot in a direction radially outward from the axis is sintered, microwave energy is coupled to each successive newly sintered layer to cause the material to which the microwave energy is coupled to grow radially outwardly so that each successive layer to be sintered is contiguous to consolidated material that is coupled to the source.

4. The method of claim 3, wherein said substrate is a rod which is made of a glass material.

5. The method of claim 4, which after the step of depositing also includes the step of preheating an exposed portion of the substrate to a predetermined temperature to allow the microwave energy to be coupled to the substrate.

6. The method of claim 5, wherein said step of coupling includes coupling a source of microwave energy at a frequency of about 2450 MHz to the substrate.

7. The method of claim 6, wherein the substrate is a solid rod-like member having a core and a cladding, the core having an index of refraction which is greater than that of the cladding and of the sintered soot material.

8. The method of claim 7, wherein the ratio of an outer diameter of the optical preform to the diameter of the substrate is in the range of about 2 to 4.

9. The method of claim 8, which also includes the step of:
   supporting the substrate for rotation about its longitudinal axis and for reciprocal movement in directions along its longitudinal axis, and wherein:
   the depositing of soot material is accomplished by moving the substrate reciprocally past a heating source while the substrate is being turned rotatably and while a soot material is being flowed into engagement with the substrate and with already deposited soot material.

10. The method of claim 9, wherein said step of coupling includes suspending the substrate with the soot material deposited thereon with its longitudinal axis being oriented vertically and moving the substrate and soot material reciprocally into and through a furnace which is capable of coupling microwave energy to the substrate.

11. A method of making optical fiber, said method comprising the step of providing an optical preform from which optical fiber is capable of being drawn in accordance with the steps of the method of claim 3 and further includes the step of drawing optical fiber from the preform.

12. The method of claim 11, wherein said step of coupling includes coupling a source of microwave energy at a frequency of about 2450 MHz to the substrate.

13. The method of claim 12, wherein the substrate is a solid rod-like member having a core and a cladding, the core having an index of refraction which is greater than that of the cladding and of the sintered soot material.

14. The method of claim 13, wherein the ratio of an outer diameter of the optical preform to the diameter of the substrate is in the range of about 2 to 4.

15. The method of claim 14 which also includes the step of supporting the substrate for rotation about its longitudinal axis and for reciprocal movement in directions along its longitudinal axis, and wherein the depositing of soot material is accomplished by moving the substrate reciprocally past a heating source while the substrate is being turned rotatably and while a soot material is being flowed into engagement with the substrate and with already deposited soot material.

16. The method of claim 15, wherein said step of coupling includes suspending the substrate with the soot material deposited thereon with its longitudinal axis being oriented vertically and moving the substrate and soot material reciprocally into and through a furnace which is capable of coupling microwave energy to the substrate.

* * * * *